3,712,829
LUBRICIOUS, LABEL-ACCEPTING GLASS
SURFACE COATING
Herman A. Steigelman, Toledo, Ohio, assignor to
Owens-Illinois, Inc.
No Drawing. Filed Nov. 28, 1969, Ser. No. 880,967
Int. Cl. C03c 17/32
U.S. Cl. 117—54                             5 Claims

ABSTRACT OF THE DISCLOSURE

A mixture of polyvinyl alcohol and polyoxyethylene stearate is applied directly onto a glass surface to provide a label-accepting, lubricious coating therefor.

---

The present invention relates to glass surface treatments and more particularly to a method for treating glass surfaces to enhance their scratch and abrasion resistance; the invention further relates to glass surfaces having a lubricious, protective coating which is receptive to paper label adhesives.

It is generally known that glass derives its strength from an unblemished surface and any scratching thereof tends to reduce the strength to approximately one-fourth of its original value. The very nature of the glass manufacturing and packaging industry, with its high-speed, in-line operations, makes it virtually impossible to prevent surface scratching of glass containers because of the abusive manner in which the articles are handled from the time they leave the annealing lehr to the time their contents are ultimately consumed by the public. That is, after being annealed, the articles are gauged, packed, transported, unpacked, washed, filled, labeled, repacked, transported for consumption, and finally sold to the public for consumption of their contents; all of the operations necessitate rubbing or contacting the glass in a number of ways which result in scratching and loss of strength.

In an effort to minimize the strength loss from surface scratching, and the resulting glass breakage, various attempts have been made in the past to coat the exterior surfaces of glass containers with abrasion-resistant coatings of one sort or another. Some of these coating compositions have been employed commercially and impart scratch resistant properties to glassware of all types but they are not entirely satisfactory. For example, in some instances, the coating compositions are complex dispersions prepared by costly, time-consuming techniques, and thus are not economically suitable for use in the glass container industry. In other instances, the coating compositions, although improving the glass surface with respect to scratch and abrasion resistance, considerably reduce the affinity of the usual water-activated paper labeling adhesives, such as casein, dextrin, and jelly gum, to the surface. As a result, it is difficult to permanently attach paper labels to these surfaces. In fact, treated surfaces frequently present a worse labeling surface than does the bare untreated glass. Polyethylene, for example, is known to present labeling problems with water-activated adhesives because of its hydrophobic nature.

In the past, attempts have been made to develop permanent, universal coatings suitable for use on glass containers and glassware which have widely divergent end uses. To be of utility for this purpose, the coatings generally were required to possess many properties, including a high resistance to caustic environments, steam, water washings and sterilization without significant impairment of the coating's original lubricity and scratch resistance. Certain glassware in the course of its manufacture, filling and usage is not subjected to the severe conditions, for example, caustic washing, to which other glassware is subjected; consequently, the use of the more permanent coatings, as may be required for the latter type of glassware is not economically justified, because of the expense and complexity of their application, for use on the former type of ware. The use of permanent dual coatings, that is, the application of an organic coating to metal oxide-primed glass surfaces, its not required, for example, in the case of liquor ware, nor is the use of such dual coatings feasible from an economic point of view in all instances.

With the foregoing in mind, it is an object of this invention to provide a method for forming a lubricious, scratch and abrasion resistant coating on a glass surface, which coating has excellent affinity for water-activated paper label adhesives.

Another object of this invention is to provide a thin, substantially colorless and transparent coating on a glass surface, which coating is easily and rapidly manufactured.

Yet another object of this invention is to provide an expedient method for forming a lubricious, scratch and abrasion resistant, thin, substantially colorless coating on liquor ware, which coating is highly receptive to paper label adhesives.

Another object is to provide an article of manufacture having a glass surface and a thin, substantially colorless and transparent coating bonded directly to said surface, the coating imparting improved scratch resistance and providing a surface which has an affinity for paper labels.

The above objects and other advantageous features of this invention are attained by applying a mixture of polyvinyl alcohol and polyoxyethylene stearate onto a glass surface while said surface is at a temperature below about 450° F. Advantageously, the polyvinyl alcohol-polyoxyethylene stearate treating composition is sprayed in an aqueous medium onto the bare external surface of a glass container as it exits from the annealing lehr and has a temperature of about 100° F. to about 450° F.

As indicated above, the organic coating composition is well adapted to the glass container manufacturing process since the coating may be economically applied to the surface of a glass container as it exits from the annealing lehr. When so used, the organic coating composition, that is, the polyvinyl alcohol-polyoxyethylene stearate mixture, may be applied by any suitable means such as a traversing spray nozzle located near the cold end of the lehr. The glass surface temperature at this coating application point will generally be about 100° F. to about 450° F. and the rate of application may vary over a wide range to produce the thin, substantially colorless coating. Acceptable coating application rates will, however, generally be about one-half to about 5 quarts of the mixture per 100 square feet of the lehr belt.

Proportions of the polyvinyl alcohol and polyoxyethylene stearate in the organic coating composition may vary over a wide range with a practical application system being the primary consideration. The ratio of the polyvinyl alcohol to the polyoxyethylene stearate will advantageously be greater than about 1:1 and can go as high as 10:1 and still function in a satisfactory manner. However, the lubricity has been observed to decrease as higher ratios are used. Accordingly, the preferred range of the weight ratio of the two materials, i.e., polyviny alcohol: polyoxyethylene stearate, is on the order of about 1:1 to about 3 or 4:1.

The preferred vehicle for application of the coating is distilled water although it is to be understood that no criticality is attached thereto and other solvents, such as alcohols or ordinary water, may be used. Distilled water is recommended because impurities are kept out of the coating and there is less chance for undesirable chemical reactions to take place between the impurities and the coating ingredients. Moreover, with the use of distilled water, less maintenance on equipment is needed since the solvent is a major constituent of the mixture. As between water and organic solvents, the use of water is, in general, less hazardous to plant personnel than is the use of a more volatile solvent such as alcohols and the like. Moreover, organic solvents are more expensive than water, making the latter more preferred from an economic standpoint.

The concentration of the polyvinyl alcohol and polyoxyethylene stearate in water may vary over a wide range and, of course, the rate of application will be dependent on the concentration. Concentrations generally on the order of about 0.15% to about 0.75% by weight of active ingredients are preferred, although concentrations as low as 0.05% and as high as 3 to 5% may be employed. The most important criterion for choosing the rate of application, concentration and proportion of ingredients in the coating composition will be the matter of glassware manufacturing economics. An economically suitable operation will comprise the use of a 1:1 mixture of the active ingredients at a concentration of about 0.15 to 0.35 percent by weight of solids in water with an application rate of about 1 quart per 10 square feet of lehr belt.

Both the polyvinyl alcohol and the polyoxyethylene stearate constituents of the coating composition are well known and commercially available. Polyvinyl alcohol having a residual acetate group content of about 10 percent by weight, is suitable for use in this invention, with a residual acetate group content of less than 5 percent being preferred and a residual acetate group content of less than about 1 percent being highly preferred. Polyoxyethylene stearate having a molar ratio of about 8 to about 100 moles of polyoxyethylene per mole of stearate is suitable for use in this invention. Although neither of these constituents is entirely satisfactory when used alone, it has been surprisingly found that in combination, these materials provide a coating which is well adapted for use on glassware and especially liquor ware. That is, polyvinyl alcohol per se produces a water-sensitive, tacky coating having virtually no lubricity and polyoxyethylene stearate per se is highly sensitive to the presence of water and therefore tends to be removed easily. The latter coating likewise does not strongly bond with water-activated paper label adhesives, for example, jelly gum. Although not fully understood, it is believed that the polyvinyl alcohol functions to partially insolubilize the polyoxyethylene stearate, thereby providing a more water-resistant, lubricious, scratch and abrasion-resistant coating, which has a high affinity for paper label adhesives.

The following serves to illustrate the present invention but is not to be considered as a limitation thereof in any way.

EXAMPLE

A treating solution was prepared by adding 0.125 part by weight polyvinyl alcohol having a residual acetate group content of less than 1 percent and 0.125 part by weight polyoxyethylene monostearate having a ratio of about 40 moles polyoxyethylene per mole of stearate to about 99.75 parts distilled water at a temperature of about 75° F. and the ingredients agitated for about 5 minutes. The treating solution was then sprayed onto newly formed, 1 quart glass liquor ware containers as they were conveyed from the annealing lehr. The surface temperature of the glass was about 100° F. to 450° F. and a sufficient amount of the solution was applied to coat the entire external surface with a thin, substantially colorless coating. The treated containers had a hard coating which coating resisted scratching when rubbed together by hand. In contrast, untreated containers were easily scratched when rubbed together in a like manner. Additionally, paper labels respectively employing casein, dextrin and jelly gum adhesives were attached to the coated surfaces and the bonding was excellent.

The scratch resistance of these bottles was evaluated on a scratch test device, the bottles being tested dry and immersed in water. This scratch test device is designed to abrade the surface of one glass bottle against the surface of a similar glass bottle, and is fully described and illustrated in U.S. Pat. No. 3,323,889. Thus, a bottle is fastened securely in a stationary low set of chucks, while a second bottle is fastened in a set of upper chucks, which are positioned so that the axes of the bottles are at 90° relative to each other. A test load is applied to the upper bottle while it is being driven at a constant speed of 2.8 inches per minute in a direction 45° to the axis of each bottle.

Using the foregoing test apparatus, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted. The force exerted by the second bottle is a known, measured force and, after each pass, the bottles are examined for scratches. The scratch resistance test value is the least force value, usually expressed in pounds, that causes a visible scratch on the surface of the test bottles. Higher test values thus indicate better abrasion resistant coatings. For the purposes of comparison, it has been determined that untreated glassware has a scratch resistance test value of only about 5 pounds or less, both wet or dry.

Another known method of evaluating the lubricious quality of a treated surface is by determining the angle of repose, with a low angle indicating a more lubricious surface. The angle of repose is determined by placing two bottles horizontally side by side on a supporting platform and then placing a third bottle, also in a horizontal position, directly upon the first two bottles so as to form a pyramid. One end of the supporting platform is then lifted slowly at a uniform rate so as to generate an angle with the horizontal. The angle of the platform to the horizontal at the time the third bottle begins to slide relative to the first two bottles, which are prevened from moving with respect to the platform, is referred to as the angle of repose. The more lubricious the surface, the lower will be the angle of repose. Apparatus for measuring the lubricity of glass surfaces are well known in the art.

When tested for their scratch resistance and lubricity, the containers which had been treated as described above, showed a dry scratch resistance of about 40 pounds and a wet scratch resistance slightly in excess of about 5 pounds; the angle of repose which, as indicated above, is a measure of the lubricity, was approximately 7° with a dry test and the wet-tested container had an angle of repose of about 17°. For purposes of comparison, containers which were treated with polyoxyethylene monostearate alone at a concentration level of about 0.17% by weight in distilled water showed angles of repose of 17° and 42° on a dry and wet test respectively. It will thus be seen that the coating of this invention has significantly more lubricity than does the sole use of polyoxyethylene monostearate.

While the manner of making and using the present invention has been described above, it will, of course, be apparent that modifications are possible. Consequently, in accordance with the patent laws and statutes, the true scope of the invention is as defined in the following claims.

I claim:

1. A method for applying a lubricious, label-accepting coating onto a glass surface comprising treating said surface while at a temperature of less than about 450° F. with an aqueous solution of a mixture consisting of polyoxyethylene stearate and polyvinyl alcohol having a residual acetate group content of less than 10 percent by weight, the ratio of said polyvinyl alcohol to said polyoxyethylene stearate being in the range of about 1:1 to about 10:1 and the concentration of said mixture in said aqueous solution is about 0.05% to about 5% by weight, said mixture being applied in an amount sufficient to form a thin, substantially colorless coating thereon.

2. The method of claim 1 wherein said solution is sprayed onto said surface.

3. The product produced in accordance with the process of claim 1.

4. A method of applying a lubricious, label-accepting coating to a glass surface comprising spraying onto said surface while at a temperature between about 100° F. and about 450° F. an aqueous solution of a mixture consisting essentially of polyvinyl alcohol having a residual acetate content of less than 5 percent by weight and polyoxyethylene stearate, the ratio of said polyvinyl alcohol to said polyoxyethylene stearate being in the range of about 1:1 to about 4:1 and the concentration of said mixture being about 0.15% to about 0.75%, said mixture being applied in an amount sufficient to form a thin, substantially colorless coating on said surface.

5. The method of claim 4 wherein said ratio of polyvinyl alcohol to polyoxyethylene stearate is about 1:1 to about 3:1 and wherein said concentration is about 0.15% to about 0.35% and wherein said polyvinyl alcohol has a residual acetate group content of less than about 1 percent by weight.

References Cited

UNITED STATES PATENTS

| | | | |
|---|---|---|---|
| 2,813,045 | 11/1957 | Abbott | 117—54 |
| 3,498,825 | 3/1970 | Wiens | 117—54 X |
| 3,507,680 | 4/1970 | Kiel | 117—124 X |
| 3,525,636 | 8/1970 | Bogart | 117—124 UX |
| 3,296,174 | 1/1967 | Pickard | 117—124 X |

WILLIAM D. MARTIN, Primary Examiner

B. D. PIANALTO, Assistant Examiner

U.S. Cl. X.R.

117—104 R, 124 D, 124 E, 161 UE